United States Patent [19]
von Allwörden

[11] Patent Number: 5,911,625
[45] Date of Patent: Jun. 15, 1999

[54] SELF-PROPELLED AGRICULTURAL HARVESTER

[75] Inventor: Willhelm von Allwörden, Oberstotzingen, Germany

[73] Assignee: Same Deutz-Fahr S.P.A., Treviglio, Italy

[21] Appl. No.: 08/921,886

[22] Filed: Aug. 25, 1997

[30] Foreign Application Priority Data

Sep. 5, 1996 [DE] Germany ............................ 196 35 992

[51] Int. Cl.$^6$ ............................ A01D 47/00; A01F 12/00
[52] U.S. Cl. ............................ 460/119; 56/14.5; 56/15.2; 56/213
[58] Field of Search ............................ 460/119, 21, 116; 172/311; 56/14.3, 14.5, 15.1, 15.2, 15.5, 15.9, 125, 189, 192, 212, 213, 228, 220

[56] References Cited

U.S. PATENT DOCUMENTS

| | | | |
|---|---|---|---|
| 2,262,906 | 11/1941 | Raney et al. ............................ | 56/122 |
| 4,185,445 | 1/1980 | van der Lely ............................ | 56/192 X |
| 4,409,780 | 10/1983 | Kalverkamp ............................ | 56/228 |
| 4,715,172 | 12/1987 | Mosby ............................ | 56/14.5 X |
| 4,903,470 | 2/1990 | Hemker et al. ............................ | 56/228 |

FOREIGN PATENT DOCUMENTS

| | | | |
|---|---|---|---|
| 1 151 431 | 8/1983 | Canada ............................ | 56/228 |
| 0534199 | 9/1992 | European Pat. Off. . | |
| 1544272 | 10/1968 | France . | |
| 3605933 | 8/1987 | Germany . | |
| 6409364 | 2/1966 | Netherlands . | |
| 6809122 | 9/1968 | Netherlands . | |
| 6712090 | 3/1969 | Netherlands . | |
| 7212210 | 11/1972 | Netherlands . | |
| 92/09190 | 6/1992 | WIPO . | |

*Primary Examiner*—Terry Lee Melius
*Attorney, Agent, or Firm*—Hardaway Law Firm, P.A.

[57] ABSTRACT

A self-propelled agricultural harvester (1) is equipped with a fold up crop gathering attachment (6) having at least two sections which are adjustable for road travel. The adjustment narrows the harvester to a permissible width for road travel while maintaining adequate operator visibility to comply with governmental regulations.

12 Claims, 6 Drawing Sheets

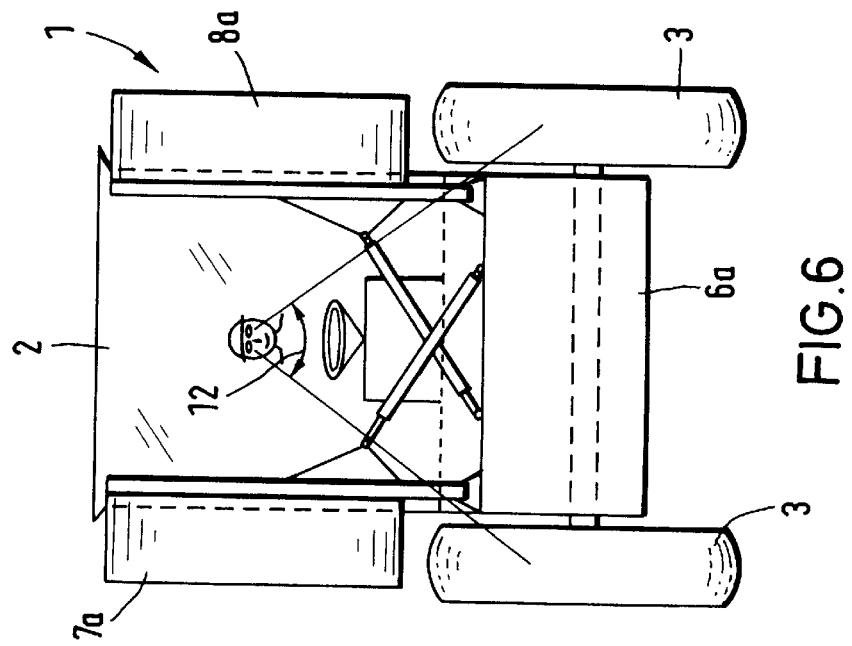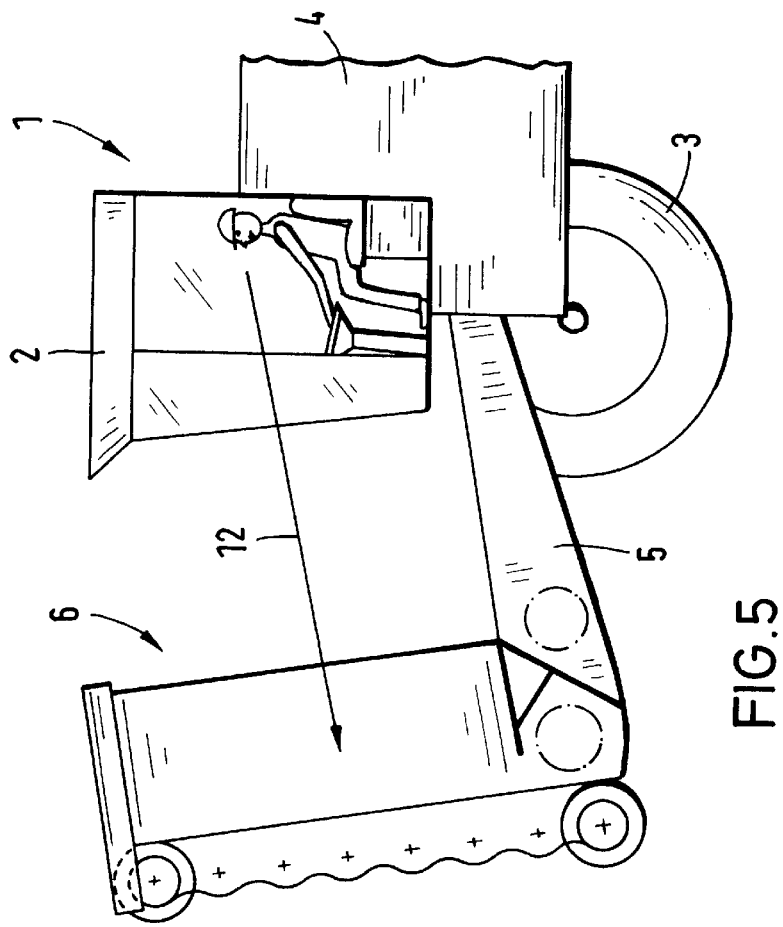

SELF-PROPELLED AGRICULTURAL HARVESTER

TECHNICAL FIELD

This invention relates to a self-propelled agricultural harvester and particularly to a harvester whose crop receiving attachment has sections which may be folded up to permit the harvester to travel on roads.

BACKGROUND OF THE INVENTION

German Patent document DE-AS 14 82 896 describes a combine harvester having a divided cutting mechanism, the two halves of the cutting mechanism being pivotable about an axis lying in the longitudinal direction of the combine harvester, whereby the halves of the cutting mechanism can be brought into a travel position. In this travel position, the two halves of the cutting mechanism are positioned perpendicularly and mutually parallel in front of the operator's station which impairs the operator's view of the area in front of the combine. Residual straw or other crop material clinging to the cutting mechanism increases the impairment. This impairment of the operator's view greatly restricts road travel and may render road travel impossible. Increased traffic hazard results when this prior art harvester travels on a road.

In European Patent document EP-A1 0 373 406, two halves of a cutting mechanism are slid substantially past one another for road travel. The already described disadvantages result from such an arrangement and an intricate mechanical system is necessary in order to slide the two halves of the cutting mechanism past one another.

In using a combine harvester, it is known, moreover, to detach the mower platform and place it on a wagon or trailer which is hitched to the back of the combine harvester for road travel. This substantially reduces the maximum speed of the combine harvester and maneuvering is restricted, particularly when traveling in reverse. Also, the attachment and detachment of the mower platform and the hitching and unhitching of the trailer require considerable time and such activity greatly increases risk of injury to the operator.

OBJECTS AND SUMMARY OF THE INVENTION

It is an object of the invention to create a self-propelled agricultural harvester which, when traveling to the place of use and back, will travel safely and comply with governmental regulations regarding maximum permissible vehicle width and the driver's field of view, which in one country is a 12 meter circle.

It is a further object of the invention to provide a harvester with a header or crop pick-up mechanism which can be reduced in width for road travel without requiring detachment of the header or crop pick up mechanism from the combine. It is a further object of the invention to provide an adjustable header or crop pick-up mechanism which can be adjusted to a road travel width by a power operated control system controlled by an operator occupying the operator's station on the harvester.

In carrying out the invention, the header or crop pick up mechanism, which is mounted on the front end of a conveyor duct or housing, has at least two sections which are adjustable between working and travel positions. The sections are slidable, pivotable or movable in a combination of these movement modes into the travel position and conversely into the working position by power means controlled by the operator. Appropriate guides, transmission elements, mechanical lever systems or the like, as well as movement elements such as hydraulic cylinders or the like, can be used for this movement. The field of view required for the driver can be generated by pivoting one or two sections of the header or pick up mechanism about an axis arranged centrally or eccentrically relative to the vehicle, or about axes spaced apart from one another. In the case of two sections, one axis is also possible if an adequate spacing between the sections and the axis is provided. The sections or the pivot axes for the sections can be slid before or after hinging or pivoting, in order to provide an adequate field of view. In addition, the header sections or components thereof can be further pivoted about at least one transverse axis after pivoting the header sections about axes in the longitudinal direction of the vehicle, such pivoting serving to increase the driver's field of view.

In one embodiment of the invention, the crop gathering attachment is divided into three sections, with the two outer sections being movable to travel positions in which they are out of the driver's field of view. In the travel position, the middle section, which includes the power transmitting mechanism for driving the crop cutting and/or gathering mechanisms of the two outer sections, remains in its original position. The two outer sections are pivoted up out of the driver's field of view to the greatest extent or moved laterally alongside the operator's station in their travel positions.

In order not to exceed the blockage of the semicircle of view as permitted by governmental regulations, each of the outer sections in its hinged-up travel position is kept as narrow as physically possible as viewed from the driver's position at the operator's station. If the sections of the harvester crop gathering attachment have cross-conveying augers and grain pans, adjustment is provided to align the pans of the fold-up sections with the operator's line of vision so the sight impairment is limited to the diameter of the base cylinder of the auger and the depth of the outer shell of the pan. Parts arranged in front of the auger, such as mower drums or a pick-up device, are positioned so that they lie substantially in the visual shadow of the auger and the pan. The auger is kept as small as possible. Stiffening brackets that connect the crossbeams and brace the pan are spaced along the outer sections in such a fashion that the field of view is also sufficient in vertical extent. The change in vertical position that occurs when the conveying duct (elevator housing) is pivoted to a travel position must also be taken into consideration.

In another embodiment of the invention the outer sections of the crop gatherings attachment, as viewed in the direction of travel, are offset in front of a central section to such an extent that at least the delivery region of the cross-conveying augers of the outer sections lies in front of the pick-up mechanism of the middle section. Thus the harvested material picked up by the outer sections is conveyed laterally inward and discharged ahead of the central section. The harvested material is picked up again by the central section and is transported to the conveying duct. Space for the hinging up of the outer sections in front of the central section is created in this design. When the outer sections are pivoted to their travel position the total width of the self-propelled harvester does not exceed the allowable limit.

The outer sections are pivotally mounted on pivot structures which in turn are pivotally supported on horizontal hinge shafts supported in stiffening brackets of the central section. The pivot axes between the outer sections and the pivot structures are horizontal in the working position of the outer sections and are substantially vertical in their travel position. Thus the outer sections can be hinged up about the horizontal hinge shafts and then pivoted into a desired position about the vertical pivot axis.

The pivot structures include springs connected to the stiffening brackets of the outer sections which counterbalance the weight of the outer sections in their working positions, and pivot the outer sections into abutment with pivot stops on the structures in the travel position of the outer sections. The spring biased weight relief of the outer sections permits them to pivot to better follow irregularities in the terrain and this increases the efficiency of the self-propelled harvester. When the outer sections are pivoted to their travel positions the springs automatically pivot the sections into abutment with the pivot stops in which position obstruction to operator vision is minimized.

Such pivoting of the outer sections into abutment with their pivot stops provides the visibility required by pertinent legislative provisions and the self-propelled harvester can be driven in road travel in compliance with traffic regulations.

In another embodiment of the invention, the fold up sections of the crop gathering attachment are positioned alongside the driver's station in their travel position. The pivot structure for the fold up sections includes a pivot joint permitting pivoting of the fold up section rearwardly about an axis extending transverse to the travel direction of the vehicle. Adequate space is usually available alongside the driver's station above the front wheels. The crop processing mechanism, which is wider than the conveyor duct and the operator's station, is positioned to the rear of the operator's station.

The driver's station or exterior frame members of the agricultural harvester may include brackets, abutments or connectors for holding the fold up sections in their travel positions. In the travel position, the ascension ladder to the driver's station may be placed in a recess provided therefor or else it may be detached.

Ideally, in the travel position the fold up sections of the crop gathering attachment are arranged alongside the driver's station in positions ranging from perpendicular to parallel in relation to the ground. This is an ideal construction for a harvester in which the driver's cab (operator's station) is narrower than the processor part of the harvester positioned behind the cab. An oblique position of the fold up sections (when viewed from a lateral side of the harvester) is very favorable from an operator's visibility standpoint.

BRIEF DESCRIPTION OF THE DRAWINGS

In the following description various embodiments of the invention are described and explained on the basis of the drawings, in which:

FIG. 5 is a lateral view of an agricultural harvester incorporating a second embodiment of the invention;

FIG. 6 is a front view of the agricultural harvester of FIG. 5;

FIG. 1 shows an agricultural harvester 1 which has an operator's station positioned between the wheels of a front wheel unit 3. Adjacent to the operator's station 2 is a housing 4 which in the case of a combine harvester, contains a threshing mechanism, a cleaning mechanism, a shaker, and other crop processor parts. The housing 4 is usually wider than the operator's station 2, but this is not categorically required. A conveying duct or conveyor housing 5 is mounted on the chassis of the harvester 1. The conveyor housing 5 may be fixed to the chassis or it may be pivotally connected on a transverse axis to the chassis. A crop gathering attachment 6 is detachably mounted on the front end of the conveyor housing 5 and is disposed in front of the operator's station 2.

As shown in FIG. 2, the crop receiving attachment 6 has two sections 7 and 8, each with a driving mechanism 9 on its laterally outer end for driving a cutting mechanism, an auger or the like.

The driving mechanism 9, which may be a transmission, is in turn driven by a power transmitting mechanism, not shown, in the main part of the harvester 1.

Figure 1:
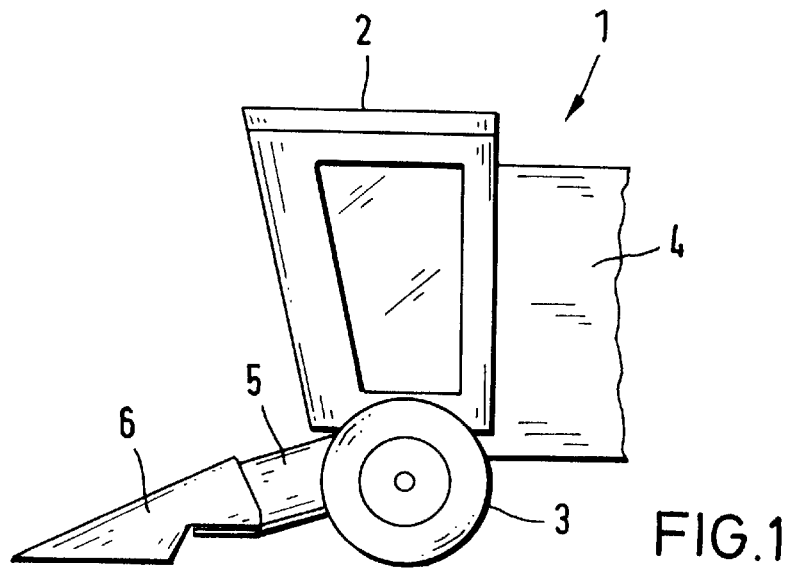
FIG. 1 is a lateral view of an agricultural harvester incorporating one embodiment of the invention.
Figure 2:
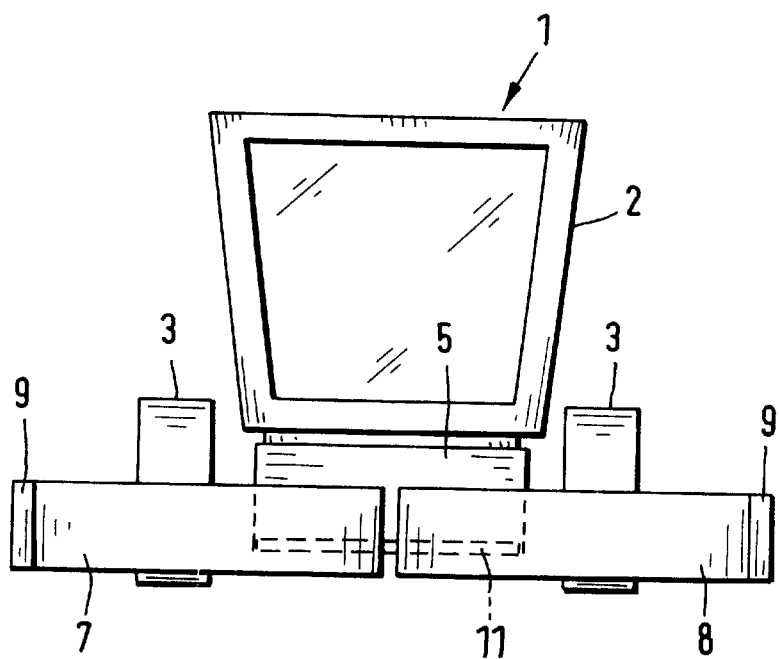
FIG. 2 is a front view of an agricultural harvester shown in FIG. 1.
Figure 3:
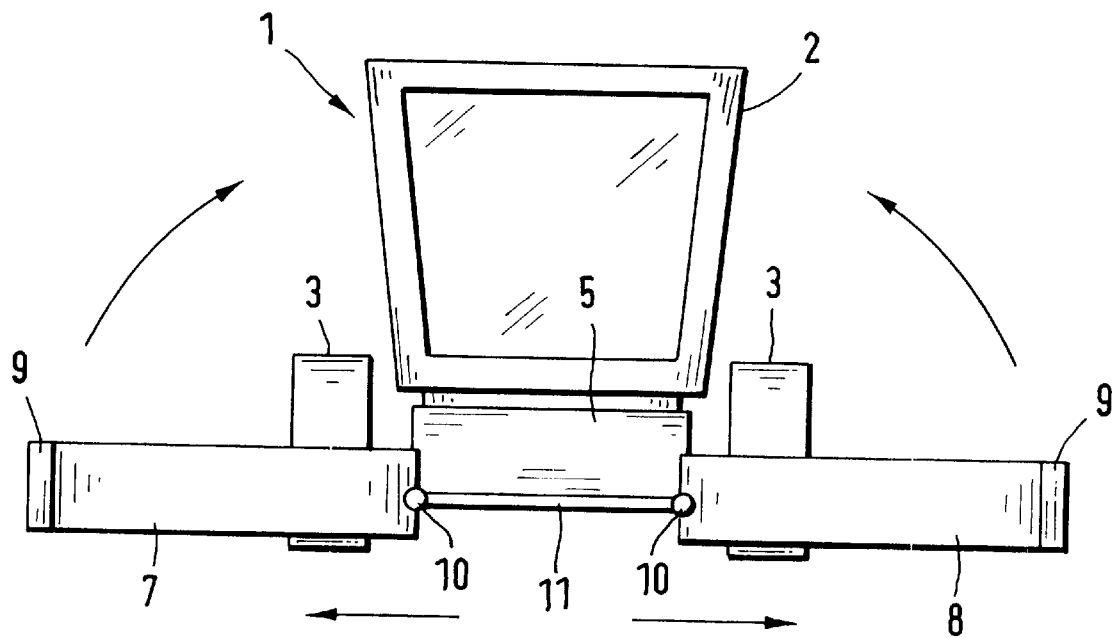
FIG. 3 is a front view of the agricultural harvester of FIG. 1.

An exemplary movement of the sections 7 and 8 of the attachment 6 out of the field of view of the driver positioned at the operator's station 2 is shown in FIG. 3. The two sections 7 and 8 are slidably mounted on a laterally and horizontally extending guide member or guide plate 11 of the conveyor housing 5 by joints 10, the joints 10 of the sections 7 and 8 being slidable outwardly along the guide plate 11. The two sections 7 and 8 are slidable in such a fashion that an intermediate open region is created, which roughly corresponds to the width of the operator's station or cab 2. This sliding is followed by a pivoting of the two sections 7 and 8 in such a fashion that the latter, in their travel position, are each arranged substantially laterally alongside the operator's station 2, in which position they are perpendicular, oblique, or parallel to the surface on which the agricultural harvester 1 rests.

Figure 4:
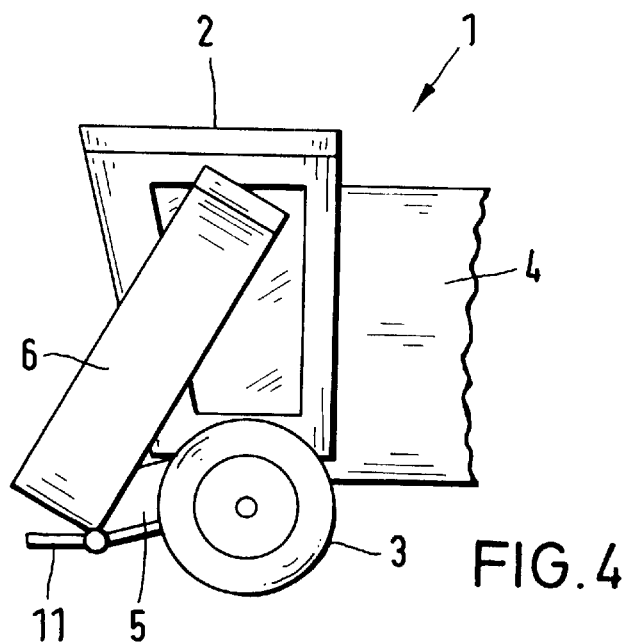
FIG. 4 is a lateral view of the agricultural harvester of FIG. 1 adjusted for road travel.

Such a travel position of the two section halves 7 and 8 of the attachment 6 is shown in FIG. 4. The joints 10 not only permit sliding of the sections 7 and 8 but also permit pivoting of the sections 7 and 8 about axes parallel to the direction of travel and horizontal axes transverse to the direction of travel.

In FIG. 5 and 6 the attachment 6 is divided into three sections. A middle section 6a is connected to the conveyor housing 5, and outer sections 7a and 8a are pivotally connected to opposite lateral ends of the middle section 6a. From FIGS. 5 and 6 it is apparent that the driver can see between the two outer sections 7a and 8a with a sufficiently large field of view 12.

Figure 8:
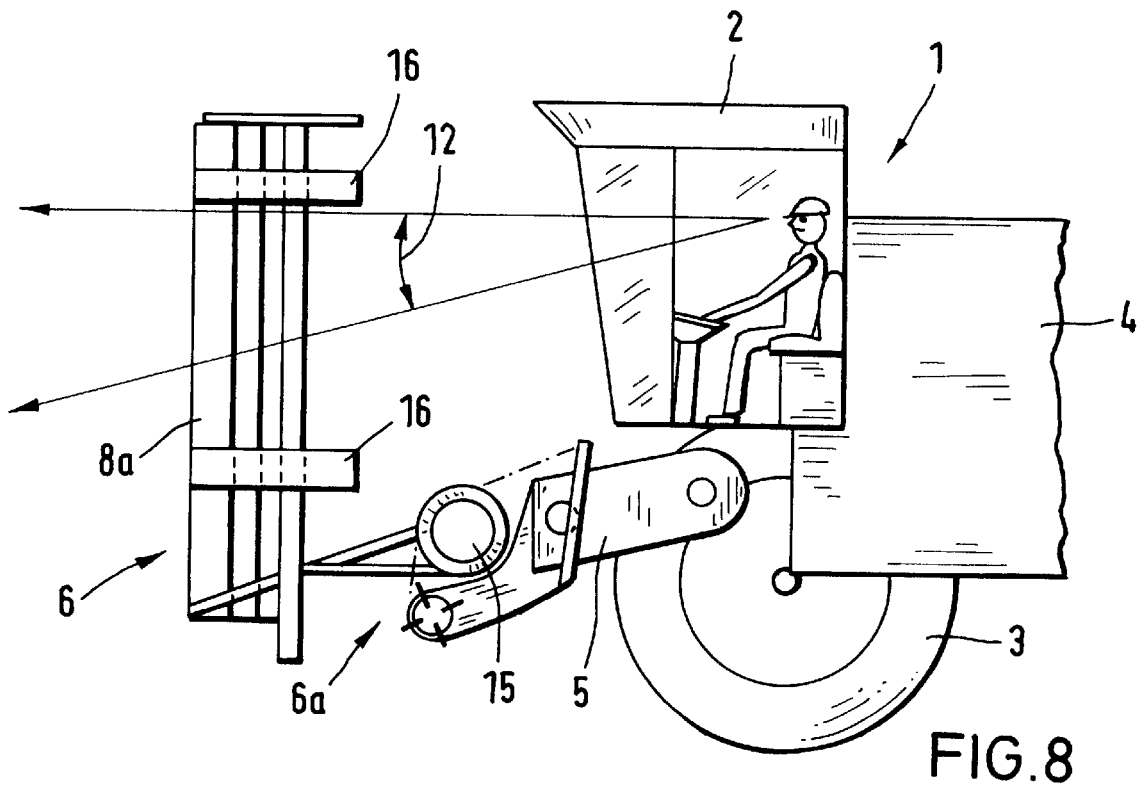
FIG. 8 is a lateral view of the agricultural harvester with the attachment of FIG. 7 mounted thereon.
Figure 7:
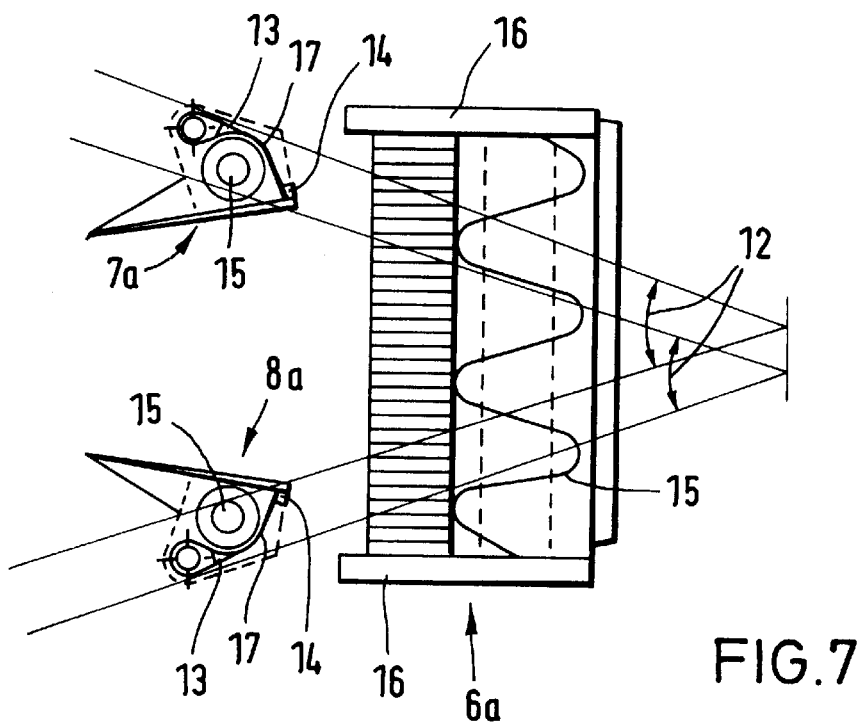
FIG. 7 is a plan view of another crop gathering attachment with outer sections hinged up.

The attachment 6 of FIGS. 7 and 8 is also divided into three sections and is a crop attachment pick up having cross-conveying augers 15 and pans 17. The outer sections 7a and 8a, which can be folded up, are arranged in front of the middle section 6a. The outer sections 7a and 8a, in the working position of the attachment 6, are offset in front of the middle section 6a, the middle section additionally picks up the harvested material picked up and collected by the outer sections. Crossbeams 13 and 14 are arranged on the outside of the pan 17 in such a fashion that they lie in the projection shadow of cross-conveying augers 15 and pans 17. The crossbeam 13 is additionally designed triangular in cross section so that it diminishes to the permissible degree the blockage of the semicircle of view. The pickup drum is also pushed into the visual shadow. As can be seen in FIG. 8 in particular, stiffening brackets 16 of the outer sections 7a and 8a, which brace the pan 17, are spaced from one another to such an extent that the permissible field of view 12 in the vertical direction is also provided.

Figure 9:
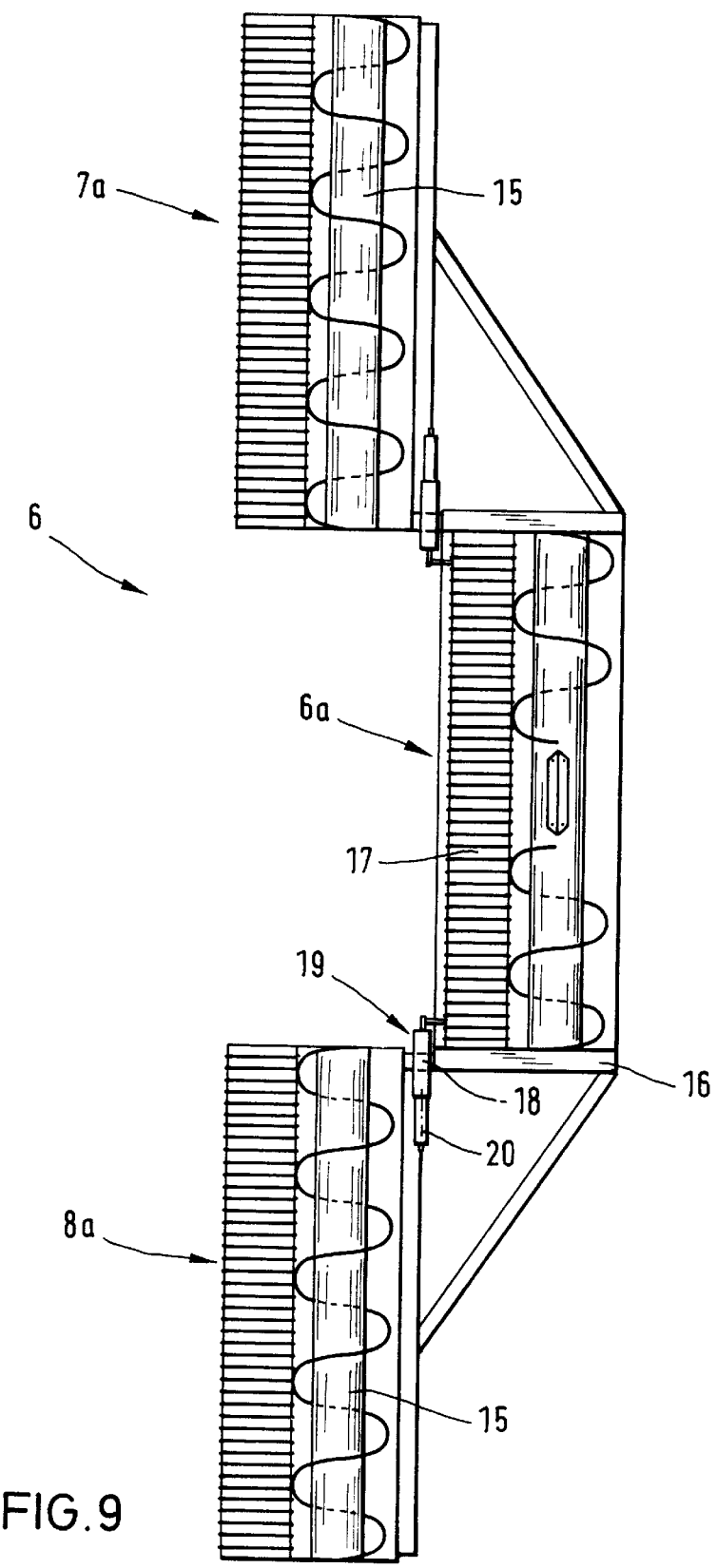
FIG. 9 is a plan view of the crop gathering attachment of FIG. 7 in working position and FIG. 10 is a plan view of the attachment of FIG. 7 in travel position.

The offset arrangement of the outer attached sections 7a and 8a , relative to the middle section 6a, is illustrated in the plan view of the three sections attachment 6 in FIG. 9. As viewed in the travel direction, the outer sections 7a and 8a are arranged offset in front of the middle section 6a to such an extent that the delivery region of the cross-conveying augers 15 of the outer sections 7a and 8a lies in front of the cutting means or pick-up mechanism 17 of the middle section 6a. Thus the harvested material picked up by the outer sections 7a and 8a is conveyed laterally inwardly and dumped ahead of the middle section 16a where it is picked up again by the middle section and transported to the conveyor housing. Also, space for the folding up of the outer sections 7a and 8a in front of the middle section 6a is created in this way.

Folding up is facilitated by the provision of hinge shafts 18, which are attached to the outer sections 7a and 8a and supported in the stiffening brackets 16 of the middle section 6a.

Attached to the hinge shafts 18 and the outer sections 7a and 8a are pivot mechanisms 19 having pivot axes, which take up a horizontal position in the working position of the outer sections 7a and 8a and a vertical position in the travel position of the outer sections.

Figure 10:
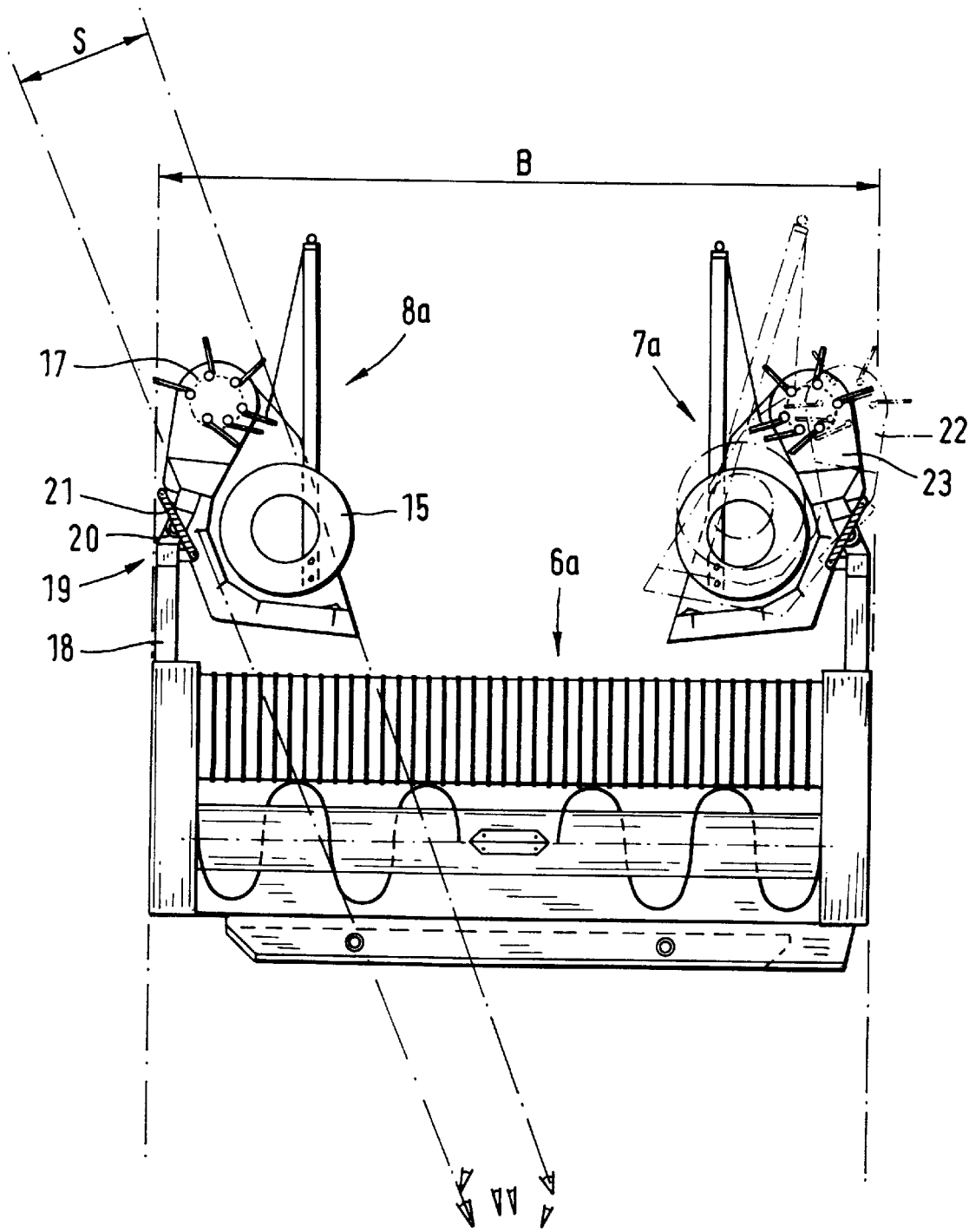

The pivot mechanisms 19 of FIG. 10 has springs 21, which are supported on components of the horizontal hinge shafts 18 and the outer sections 17a and 8a. The springs 21 relieve the outer sections of the weight force in the working position thereof and enable the outer sections to follow irregularities in the terrain, thus boosting the efficiency of the self-propelled harvester.

In the right-hand half of FIG. 10, the outer section 7a is shown in a working position by broken lines 22 and in a travel position 23 by solid lines. In the left-hand half of FIG. 10, only the travel position 23 is shown. In the travel position 23, the springs 21 hold the outer sections 7a and 8a firmly against a pivot stop, the position of which is selected in such a fashion that the outer sections take up a visually optimal position. It can be seen from FIG. 10 that the provisions of law relating to the permissible total width "B" of the vehicle and the permissible driver's view blockage "S" are maintained.

What is claimed is:

1. A self-propelled agricultural harvester for processing agricultural crops as it travels in a predetermined forward direction through a field, said harvester having a chassis supported by ground engaging traction means having a predetermined tread width and further comprising:
    an operator's station (2) near the front end of said harvester,
    a crop receiving attachment mounted on said front end of said harvester forward of said operator's station and having
        a longitudinally extending conveyor housing (5) connected at its rear end to said chassis,
        a laterally and horizontally extending guide member (11) mounted on the front end of said conveyor housing (5),
        a pair of crop gathering sections (7,8)
        a pair of joints (10) pivotally and slidingly supporting said crop gathering sections (7, 8), respectively, in said guide member (11) for movement from a crop harvesting position, in which said sections (7,8) extend laterally in opposite directions from adjacently disposed laterally inner ends to laterally outer ends disposed beyond said tread width, to a vertical transport position in which said inner ends are separated by approximately the width of said operators station (2) and said crop gathering sections (7,8) are disposed within said tread width and in laterally spaced relation to one another whereby an operator at said operator's station has an unimpaired forward field of vision for driving said harvester on a roadway.

2. The harvester of claim 1 wherein each of said crop gathering sections in said vertical transport position is adjustable about a vertical axis to a minimum obstruction position to minimize obstruction to the forward operating vision of an operator at said operator's station.

3. The harvester of claim 2 wherein said crop gathering sections each include an auger having a base cylinder and a pan, said pan and said auger in said minimum obstruction position being aligned in a manner reducing vision obstruction.

4. The harvester of claim 1 wherein said crop gathering sections each include a pan having crossbeams and stiffening brackets interconnecting said crossbeams, said stiffening brackets being slidable relative to said crossbeams to reduce obstruction to the forward vision of an operator at the operator's station when said crop gathering sections are in said vertical transport positions.

5. The harvester of claim 1 wherein said crop gathering sections in said vertical travel position lean rearwardly and are disposed on laterally opposite sides of said operator's station.

6. A self-propelled agricultural harvester for processing agricultural crops as it travels in a predetermined forward direction through a field, said harvester having a chassis supported by ground engaging traction means having a predetermined tread width and further comprising:
    an operator's station near the front end of said harvester and,
    a crop receiving attachment mounted on said front end of said harvester forward of said operator's station and having
        a longitudinally extending conveyor housing having a front end and a rear end, said rear end being connected to said chassis,
        a first crop gathering section supported on said front end of said conveyor housing and presenting first and second lateral ends,
        a second crop gathering section supported on said first lateral end of said first section for swinging movement about a first longitudinal pivot axis from a horizontal working position to a vertical travel position and,
        a third crop gathering section supported on said second lateral end of said first section for swinging movement about a second longitudinal axis from a horizontal working position to a vertical travel position said second and third sections being offset forwardly of said first section,
        said second and third sections in their vertical travel positions being disposed within the lateral width of said first section and being laterally spaced from one another sufficiently to afford an operator at said operator's station an unobstructed forward view of the terrain being traversed by the harvester in forward travel.

7. The harvester of claim 6 wherein said second and third sections in their vertical travel positions are pivotable, respectively, about substantially vertical axes to optimum vision positions whereby obstruction to forward vision of an operator at said operator's station is minimized.

8. The harvester of claim 7 and further comprising springs biasing said second and third sections toward said optimum vision positions.

9. The harvester of claim 8 wherein said springs in said working positions of said second and third sections serving to counterbalance the weight of the forward ends of said second and third sections.

10. A self-propelled agricultural harvester for processing agricultural crops as it travels in a predetermined forward direction through a field, said harvester including a chassis supported by ground engaging traction means having a predetermined tread width and further comprising:

an operators station near the front end of said harvester and, a crop receiving attachment mounted on said front end of said harvester forward of said operator's station and including a longitudinally extending conveyor housing having a front end and a rear end, said rear end being connected to said chassis, a first crop gathering section supported on said front end of said conveyor housing and presenting first and second lateral ends, a second crop gathering section supported on said first lateral end of said first section for swinging movement about a first longitudinal pivot axis from a horizontal working position to a vertical travel position and, a third crop gathering section supported on said second lateral end of said first section for swinging movement about a second longitudinal axis from a horizontal working position to a vertical travel position, said second and third sections in their vertical travel positions being pivotable, respectively, about substantially vertical axes to optimum vision positions whereby obstruction to forward vision of an operator at said operator's station is minimized and said second and third sections in said vertical travel positions being laterally spaced from one another sufficiently to afford an operator at said operator's station an unobstructed forward view of the terrain being traversed by the harvester in forward travel.

11. The harvester of claim 10 and further comprising springs biasing said second and third sections toward said optimum vision positions.

12. The harvester of claim 11 wherein said springs in said working positions of said second and third sections serving to counterbalance the weight of the forward ends of said second and third sections.

* * * * *